(12) United States Patent
White

(10) Patent No.: US 8,079,327 B2
(45) Date of Patent: Dec. 20, 2011

(54) ANIMAL TRANSPORT DEVICE

(76) Inventor: Bruce Sands White, Fountain Valley, CA (US)

( * ) Notice: Subject to any disclaimer, the term of this patent is extended or adjusted under 35 U.S.C. 154(b) by 207 days.

(21) Appl. No.: 12/056,205

(22) Filed: Mar. 26, 2008

(65) Prior Publication Data

US 2008/0257276 A1 Oct. 23, 2008

Related U.S. Application Data

(60) Provisional application No. 60/908,092, filed on Mar. 26, 2007.

(51) Int. Cl.
*A01K 29/00* (2006.01)
*A01K 1/035* (2006.01)

(52) U.S. Cl. ......... 119/496; 119/499; 119/514; 119/771

(58) Field of Classification Search .................. 119/496, 119/497, 498, 499, 512, 513, 514, 771; 135/88.01, 135/128, 88.02, 143, 88.04, 115
See application file for complete search history.

(56) References Cited

U.S. PATENT DOCUMENTS

| | | | | | |
|---|---|---|---|---|---|
| 710,726 | A | * | 10/1902 | Valiant | 248/278.1 |
| 2,079,851 | A | * | 5/1937 | Glenny | 224/420 |
| 4,010,880 | A | * | 3/1977 | Guillot-Munoz | 224/275 |
| 4,346,725 | A | * | 8/1982 | Shaw | 296/210 |
| 5,015,032 | A | * | 5/1991 | Felling | 297/184.15 |
| 5,277,148 | A | * | 1/1994 | Rossignol et al. | 119/453 |
| 5,282,439 | A | * | 2/1994 | Oaks | 119/482 |
| 5,406,816 | A | * | 4/1995 | Thomas | 62/457.1 |
| 5,487,554 | A | * | 1/1996 | May | 280/293 |
| 5,577,646 | A | * | 11/1996 | White | 224/422 |
| 5,718,191 | A | * | 2/1998 | O'Donnell | 119/771 |
| 5,785,003 | A | * | 7/1998 | Jacobson et al. | 119/496 |
| 5,921,258 | A | * | 7/1999 | Francois | 135/88.03 |
| 6,173,725 | B1 | * | 1/2001 | Garth | 135/87 |
| 6,179,183 | B1 | * | 1/2001 | Kloster | 224/433 |
| 6,374,775 | B1 | * | 4/2002 | Baumsteiger | 119/496 |
| 6,425,349 | B1 | * | 7/2002 | Laskin et al. | 119/496 |
| 6,725,807 | B1 | * | 4/2004 | Tapia | 119/496 |
| 6,866,008 | B1 | * | 3/2005 | Havard | 119/496 |
| 7,100,662 | B2 | * | 9/2006 | Nation | 160/56 |
| 7,174,852 | B2 | * | 2/2007 | Jefferson | 119/496 |
| 7,255,121 | B2 | * | 8/2007 | Milner et al. | 135/88.01 |
| 7,628,120 | B2 | * | 12/2009 | Beeler | 119/496 |
| 2006/0169218 | A1 | * | 8/2006 | Chang | 119/496 |
| 2007/0163512 | A1 | * | 7/2007 | Di Angelo et al. | 119/484 |
| 2008/0083374 | A1 | * | 4/2008 | Thomas et al. | 119/28.5 |

* cited by examiner

*Primary Examiner* — Yvonne R. Abbott
(74) *Attorney, Agent, or Firm* — Hani Z. Sayed; Rutan & Tucker, LLP

(57) ABSTRACT

A pet transportation device is provided. The pet transportation device is provided whereby the device is easily adaptable to a mobile unit including a bicycle, scooter and/or motorcycle. In an exemplary embodiment, the pet transportation device has at least a wire basket carrier which is adapted to placement and holding of the pet during transport and at least a cover portion which encloses about the head portion of the pet and may be adapted for folding when not desired by the individual. The basket may be removably attached to at least a portion of the handlebars of a mobile unit by a clamping means and may have padded rail support incorporated thereon. Additionally, the pet transport device may additionally have a liner and/or cushion to protect the limbs of the animal from protruding away from the pet transport device.

19 Claims, 4 Drawing Sheets

ANIMAL TRANSPORT DEVICE

PRIORITY CLAIM

This application claims priority to U.S. Provisional Application No. 60/908,092 filed on Mar. 26, 2007.

BACKGROUND OF THE INVENTION

1. Field of the Invention

This invention pertains to a device for the transport of an animal. More particularly, the invention pertains to a basket assembly with canopy for attachment to a bicycle for transporting an animal while on a bicycle.

2. Description of the Prior Art

The family pet has become increasingly important to the average household. Many families have multiple pets and treat their household pets with the love and care that is usually reserved for humans. The family pet, whether it be a dog, cat, hamster, rabbit, fish or the like, has become a multi-million dollar industry with pet stores catering to different animal tastes in food, entertainment, clothing, toys and the like. The industry of pet care has even expanded past the traditional pet store atmosphere whereby an individual can shop at a traditional retail store and find pet care relative devices and accessories that may be utilized by a pet owner. For example, pet carriers, clothing and entertainment accessories may be found in department stores, discount stores and the like. Additionally, pet stores have become more elaborate to cater to the tastes of the individual pet owner including selling items like elaborate collars, pet holders, toys, grooming packages and the like.

One of the problems that faces any pet owner is the inability to travel with their pet. Many pets are too large to be transported efficiently or effectively. Additionally, another problem that faces many pet owners is that the devices currently in use for transport of a pet are typically crude, confining and uncomfortable to the pet. Many different types of pet carriers have been designed and implemented, but many are not suitable for long periods and the pets are typically confined to what essentially is a type of box. Moreover, during transport in a mobile vehicle, an animal in a moving vehicle is susceptible to the same forces as the driver or any passenger of that vehicle. However, unlike humans, the animal has no restraint system to keep it from being subjected to the gravity and velocity of the moving vehicle. Therefore it is very possible that an animal may be injured during transport from one place to another, or even during a leisurely drive with its owner. There are pet carriers that are made for mobile transport of an animal such as dog and cat carriers.

However, most of these prior art carriers are made to confine the movement of the animal relative to the carrier. For example, the carrier is essentially an enclosed receptacle that closes the animal off from any elements. Additionally, the carrier confines movement and also confines the vision of what is going on outside the receptacle. The pet is unable to see what is happening around them and is often frightened by the confined space.

Another problem that exists is that many pets like the feeling of riding in cars and other motion vehicles, and many owners like to take their pets with them wherever they go whether they are going to the grocery store, the park or the beach. However, no suitable carrier has been produced for an animal to be taken along. Moreover, with respect to individuals that like to bicycle, the movement of the bicycle is typically too fast for the average pet to be able to keep up with, and thus the bike rider cannot take the pet because the individual rider needs both hands to navigate the bicycle.

What is needed is a pet carrier for a vehicle whereby the pet carrier may be removably attached to at least a portion of the mobile vehicle for transport of the animal. Further, a need exists for an inexpensive and efficient pet carrier that is comfortable for the pet and allows for adaptability of the unit for enjoyment of the pet and the individual user of the pet carrier.

SUMMARY OF THE INVENTION

The present invention generally provides a pet transportation device. More specifically, the present invention provides a pet transportation device which is easily adaptable to a mobile unit including a bicycle and/or motorcycle. In an exemplary embodiment, the pet transportation device has at least a wire basket carrier which is adapted to placement and holding of the pet during transport and has at least a cover portion which encloses about the head portion of the pet. The basket may be removably attached to at least a portion of the handlebars of a mobile unit by a clamping means and may have padded rail support incorporated thereon. Additionally, the pet transport device may additionally have a liner and/or cushion to protect the limbs of the animal from protruding away from the pet transport device.

To this end, in an exemplary embodiment of the present invention, a pet transport device is disclosed. The device has a basket adapted for fitment of an animal and a clasp assembly to attach the basket to a mobile vehicle. Additionally, the device has at least a canopy assembly whereby the canopy assembly is removably attached to the basket.

In an exemplary embodiment, the animal transport device has a clamp assembly which is attached to the handlebars of a mobile vehicle.

In an exemplary embodiment, the animal transport device has a mobile vehicle whereby the mobile vehicle is a bicycle.

In an exemplary embodiment, the animal transport device has a canopy assembly which is adapted to extend above the basket and the head of an animal to provide shade for the animal.

In an exemplary embodiment, the animal transport device has a basket whereby the basket may further comprise at least a liner and cushion to protect the animal's feet from protruding away from the basket.

In an exemplary embodiment, the animal transport device has a basket whereby the basket may have at least a first side, a second side, a third side and a fourth side whereby each of said sides extend upwards away from the bottom portion of the basket.

In an exemplary embodiment, the animal transport device has a top portion of each side of the basket which has a padded rail which protects the animal's extremities from injury.

In an exemplary embodiment, the animal transport device has a basket which is constructed of metal.

In an exemplary embodiment, the animal transport device has a canopy assembly which is constructed of any of the following: nylon, cotton, canvas, rip-stop nylon, foam and plastic.

In an exemplary embodiment, the animal transport device has a canopy assembly which is foldable and collapsible for storage of the canopy when not in use.

In an exemplary embodiment, the animal transport device has a canopy assembly which is comprised of at least an arm attached to a pivot hinge and a bracket whereby the bracket is attached to the basket by an attachment means and a bracket plate.

To this end, in an exemplary embodiment of the present invention, a method of utilizing an animal transport device is provided. The method comprises the steps of: providing a basket adapted for fitment of an animal; providing a clasp assembly to attach the basket to a mobile transport vehicle; and installing a canopy assembly whereby the canopy assembly is removably attached to the basket.

In an exemplary embodiment, the method of utilizing an animal transport device comprises the step of: providing a canopy assembly with at least an arm attached to a pivot hinge for pivoting of the canopy assembly relative to the basket.

In an exemplary embodiment, the method of utilizing an animal transport device comprises the step of: attaching the canopy assembly and the basket to the handlebars of a mobile transport vehicle.

In an exemplary embodiment, the method of utilizing an animal transport device comprises the step of: providing a mobile transport vehicle whereby the vehicle is a bicycle.

In an exemplary embodiment, the method of utilizing an animal transport device comprises the step of: allowing said canopy assembly to pivot about the basket on the hinge such that the canopy may be positioned in either an extended overhead position or in a retracted open position.

In an exemplary embodiment, the method of utilizing an animal transport device comprises the step of: providing at least a pouch in the basket for storage of an article.

In an exemplary embodiment, the method of utilizing an animal transport device comprises the step of: providing a padded rail on the outside portion of the basket for safety and security of the transported animal.

In an exemplary embodiment, the method of utilizing an animal transport device comprises the step of: providing a liner and cushion for the bottom portion of the basket to secure and protect the animal from limbs protruding from the basket.

In an exemplary embodiment, the method of utilizing an animal transport device comprises the step of: providing at least a hooking mechanism which is attached to the basket and the animal for securing the animal to the basket in the event of potential disturbance and dislodgement.

In an exemplary embodiment, the pet transport device may be constructed of a suitably rigid material.

Yet another exemplary embodiment is to provide a pet transport device that may be utilized to transport a pet from one location to another without the necessity of physically handling the animal.

Still another exemplary embodiment is to provide a pet transport device that may be utilized to transport a pet from one location to another simply by a user when the user is unable to physically carry the animal.

Another exemplary embodiment of the present invention is to provide a pet transport device whereby the device has at least a wire basket carrier to hold the pet.

In an exemplary embodiment, a pet transportation device may be provided whereby the pet transportation device may have a convertible portion.

Another exemplary embodiment of the present invention is to provide a pet transport device whereby the pet transport device may have a convertible portion which is positioned above the head of the animal to protect it from outside elements.

Still another exemplary embodiment of the present invention is to provide a pet transport device whereby the pet transport device may have a convertible portion which is positioned above the head of the animal and whereby the convertible portion may be constructed of a fabric material.

Another exemplary embodiment of the present invention is to provide a pet transport device whereby the pet transport device may have a convertible portion whereby the convertible portion may be constructed of any suitable material including, rubber, plastic, wood, metal, and/or any other contemplated material that may be retracted when not in use and whereby the material is capable of protecting the animal from outside elements.

In yet another exemplary embodiment of the present invention, a pet transport device may be provided whereby the pet transportation device may be connected to a mobile transportation vehicle used by the animal owner and/or handler.

Still another exemplary embodiment of the present invention is to provide a pet transport device whereby the pet transport device may have a clamping means to clamp the device to the handlebars of a mobile transportation vehicle.

Another exemplary embodiment of the present invention is to provide a pet transport device whereby the pet transport device may have a clamping means to clamp the device to the handlebars of a bicycle.

In yet another exemplary embodiment of the present invention is to provide a pet transportation device whereby the pet transportation device may have a clamping means which is removably bolted to the handlebars of a mobile transport vehicle.

Yet another exemplary embodiment of the present invention is to provide a pet transportation device whereby the pet transportation device may have at least a convertible portion whereby the convertible portion may be releasably attached to a first top side portion of the basket and a second top side portion of the basket.

A further exemplary embodiment of the present invention is to provide a pet transport device whereby the device includes at least a basket member which is attached to the handlebars of a mobile vehicle.

In another exemplary embodiment, a pet transport device may be provided whereby the pet transport device may have a basket member which is attached to a front portion of a bicycle or a rear portion of a bicycle.

Still another exemplary embodiment is to provide a pet transport device whereby the device may have a pressure plate connected to the bracket to hold the basket member to the handlebars of a mobile vehicle.

These and other objects of the invention will become more apparent when reading the description of the preferred embodiment along with the drawings that are appended hereto. The protection sought by the inventor may be gleaned from a fair reading of the claims that conclude the specification.

DESCRIPTION OF THE PREFERRED EMBODIMENT

Figure 1:
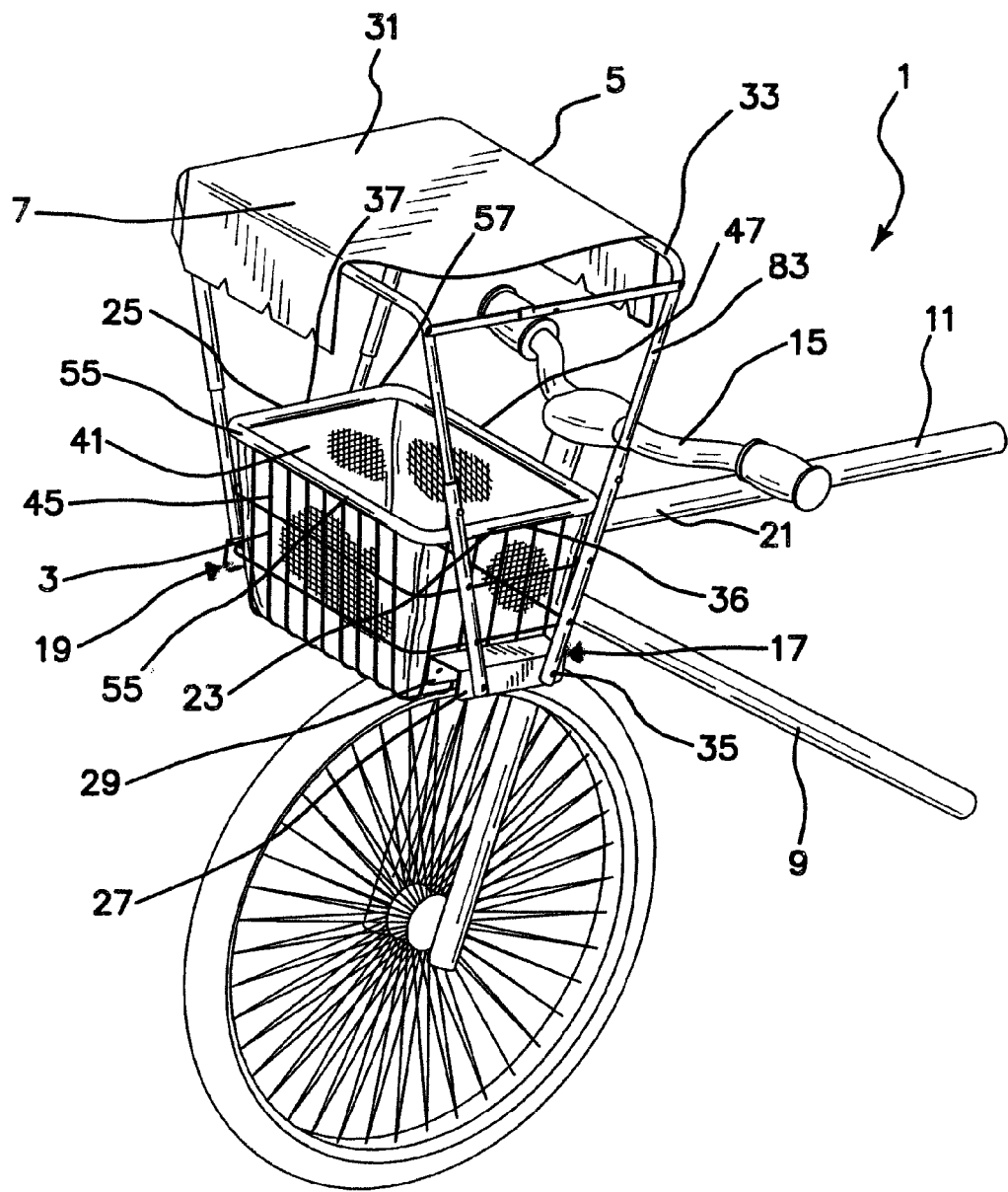
FIG. 1 is a front elevational view of one embodiment in an exemplary view of the present invention.

Turning now to the drawings, wherein elements are identified with numbers and like elements are identified by like numbers throughout the 5 drawings, FIG. 1 illustrates the pet transport device 1 in an exemplary embodiment of the present invention. The pet transport device 1 may be comprised of at least a basket carrier 3 which holds the animal (not shown). The basket carrier 3 may be constructed of metal, but it should be understood that any suitably rigid material may be utilized in the construction of the carrier. Additionally, a canopy assembly 5 and/or convertible framing having at least a fabric cover 7 which extends above the basket 3 to provide shade and a space whereby the animal (not shown) may be positioned is also provided. The basket 3 may be attached to the mobile vehicle device 9. In an exemplary embodiment of the present invention, the mobile vehicle device is a bicycle 11. However, it should be understood that the mobile vehicle device 9 may be any vehicle which may accommodate and be suitable for transport of the animal (not shown). The device 1 may be attached to at least the bicycle's 11 front handles 15 by a clamping mechanism 17. However, it should be understood that the basket assembly 3 is not limited to securement only on the handlebars 15 of a bicycle 11 but may be attached to any portion of the bicycle 11 which would be suitable for transport of the animal (not shown). In an exemplary embodiment, the clamping mechanism 17 may be a plurality of clamps 19 and/or bolts to clamp and/or secure the basket 3 to the handlebars 15 and/or the frame 21 of the bicycle 11. The device 1 may be attached to a first side 23, and a second side 25 of the basket assembly 3 by utilizing a bracket 27 and a pressure plate 29 to hold the device framing in place.

As further illustrated by FIG. 1, the top portion 31 of the canopy frame 33 may be pivotally hinged 35 such that the canopy assembly 5 may be retracted and extended when desired by the user. The brackets 27 and the framing 33 may be secured to the first 23 and second side 25 of the basket and the first 36 and second 37 uppermost edges of the first 23 and second sides 25 of the basket 3. Additionally, as can be seen in both FIGS. 1 and 2, the framing 33 may be extendable such that when transporting larger animals, the canopy 5 may be extended away from the basket assembly 3 to accommodate larger animals, and further as illustrated in FIG. 2, the framing 33 may be shortened to accommodate shorter and/or smaller animals when desired.

In an exemplary embodiment, the fabric cover 7 on the canopy assembly 5 may provide shade. The fabric cover may be developed and manufactured in a variety of shades, patterns and fabrics depending on the desires and potential uses by the individual user. Additionally, the fabric cover 7 may be cut into any desirably fashion for aesthetic purposes. The fabric cover 7 may be constructed of any suitable material such as canvas, nylon, cotton and the like. The fabric cover 7 may be attached to the frame 33 of the device 1 by use of a hook and fastener means (not shown). However, in an exemplary embodiment, the fabric cover 7 may be attached to the frame 33 of the canopy 5 by use of a zipper slot whereby the zipper is opened, slipped over the upper axis of the canopy 5 and closing the zipper holds the canopy 5 to the frame 33.

FIG. 1 also illustrates the liner and/or cushion 41 that may help protect the pet's limbs from extending through the basket assembly 3. The liner 41 may be constructed of mesh and may extend from a first side 23 of the basket portion to a second side 25 of the basket assembly 3. Additionally, the liner 41 may extend up the first 23, second 25, third 45 and fourth 47 side walls of the basket assembly 3. The liner 41 and/or cushion may provide cushioning and shock absorbency to the seating area of the basket 3. The liner 41 may be secured to the basket 3 around the top edge 51 of the basket 3. Alternatively, the liner 41 may be adhered to the padded rail 55 around the top of the basket assembly 7.

Figure 2:
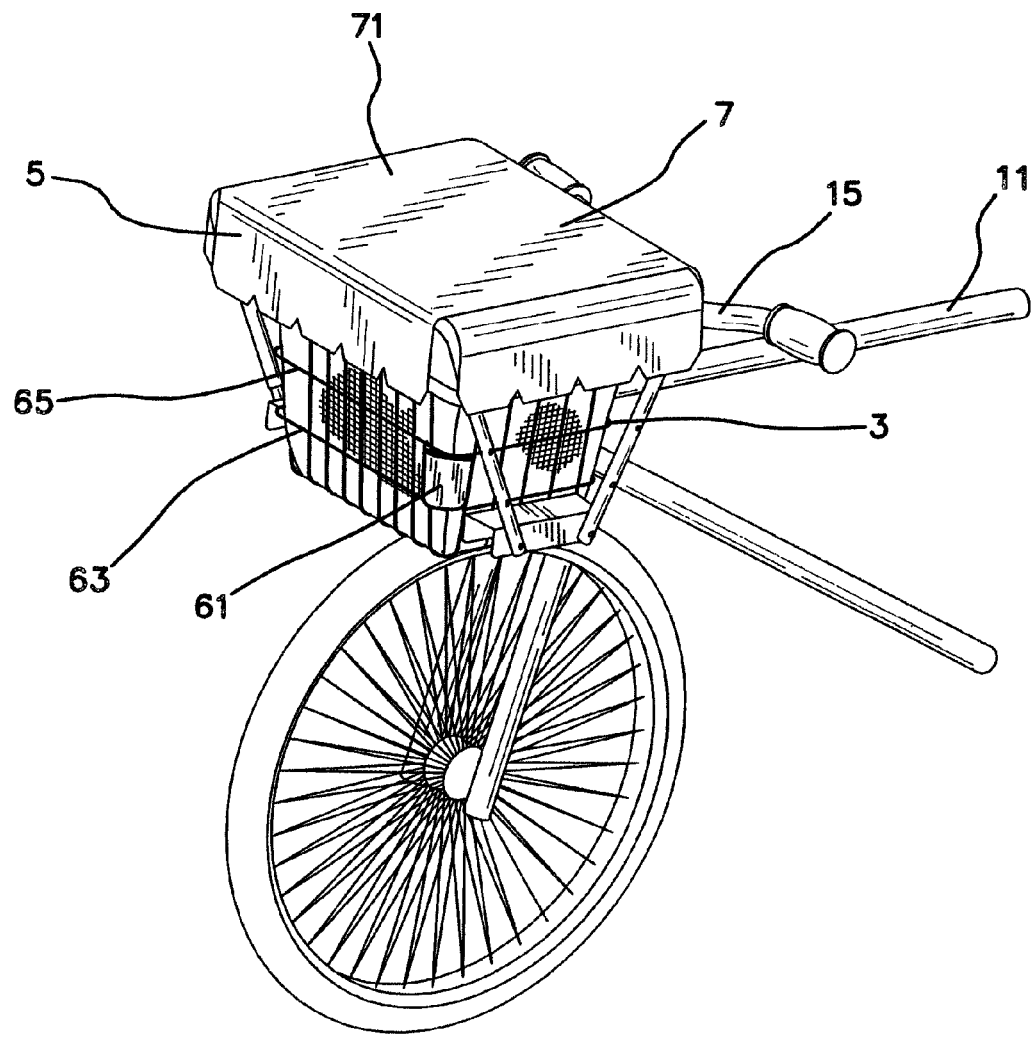
FIG. 2 is a front perspective view of the device in an exemplary embodiment of the present invention.

FIGS. 1 and 2 illustrates the padded rail 55 that may protect the pet extremities and body from injury. The rounded padded rail 55 is comprised of an open or closed cell foam split on one side to slip over the top wire edge 57 of the basket 3. In an alternative embodiment, the padded rail 55 may be constructed to be integral with the upper edge 57 of the basket 3. The foam liner may be covered with the fabric selection that matches or is complimentary to the convertible canopy material.

FIG. 2 further illustrates that the basket 3 of the device 1 may have an accessory pouch 61 that fits to the basket 3 and/or may be incorporated into the design of the basket 3 to hold items for either the pet or the owner. The accessory pouch 61 may be produced to fit around the base of the basket 3 and may be attached to the first 63 or second 65 horizontal wire above the bottom of the basket 3. The accessory pouch 61 may be attached to this horizontal wire 65 by means of a hook and fastener means (not shown) surrounding the wire and/or may utilize plastic guides that slip over the top of the wire around the perimeter. The accessory pouch 61 may be designed to hold a plurality of items of different sizes including articles for the animal such as water, food, leash, lights, toys, and/or accessories; or items for the owner including cell phones, PDAs, music systems, keys and the like. Moreover, FIG. 2 illustrates the canopy assembly fabric 7 which may be utilized to cover and provide shade for the transported animal. As illustrated, the canopy assembly 5 may be retractable and may allow for extension of the fabric 7 down from the top portion 71 of the canopy such that complete sheltering of the animal may be possible when the outside elements dictate that the animal be surrounded.

Figure 3:
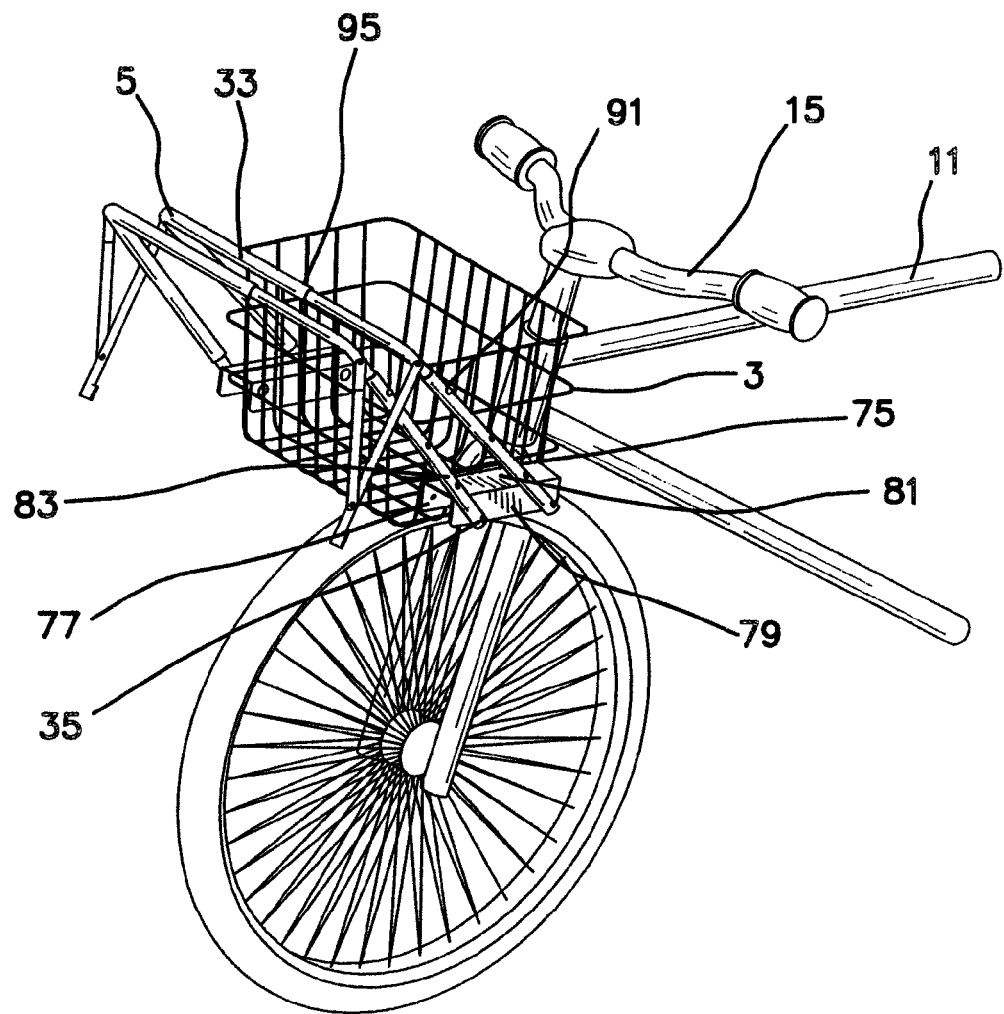
FIG. 3 is a front perspective view of the device whereby the canopy assembly is in the retracted or convertible form in an exemplary embodiment of the present invention.

FIG. 3 illustrates the canopy assembly mechanism 5. In an exemplary embodiment, the canopy cover 5 may be collapsible upon itself to fit inside the basket 3. The canopy frame 33 may be utilized to allow for collapsing of the canopy cover 7. The canopy frame 33 may be constructed of any suitable rigid material such as metal, plastic and the like. Additionally, the canopy frame 33 may be secured to the basket 3 by an attachment means 75. In an exemplary embodiment, the attachment means 75 may be a bracket 77. However, any suitable attachment means 75 may be utilized to attach the frame 33 to the basket 3. The bracket 77 may include a metal plate 79, machined and threaded bolts 81, and a bracket 77 to which the arms 83 of the canopy frame 7 are attached. The device 1 may also have compression gaskets 91 between the bracket back, basket 3, and bracket 77 which provides compression force, as well as the mechanical attachment to secure the assembly to the bicycle basket 3 which in turn is attached to the handlebars 15 of the bicycle 11.

The arms 83 of the canopy 5 can be elevated, lowered, or folded for transport. Structural stability of the canopy 5 is further strengthened by means 75 of a pivot hinge 35 on either side of the frame 33, to add specific dimensions and tautness to the fabric cover 7. The arms 83 may also be adjusted to fit various sized baskets 7 by means of an adjustable pin 95 on an upper horizontal cross bar that supports the fabric cover 7 of the canopy 5.

Figure 4:
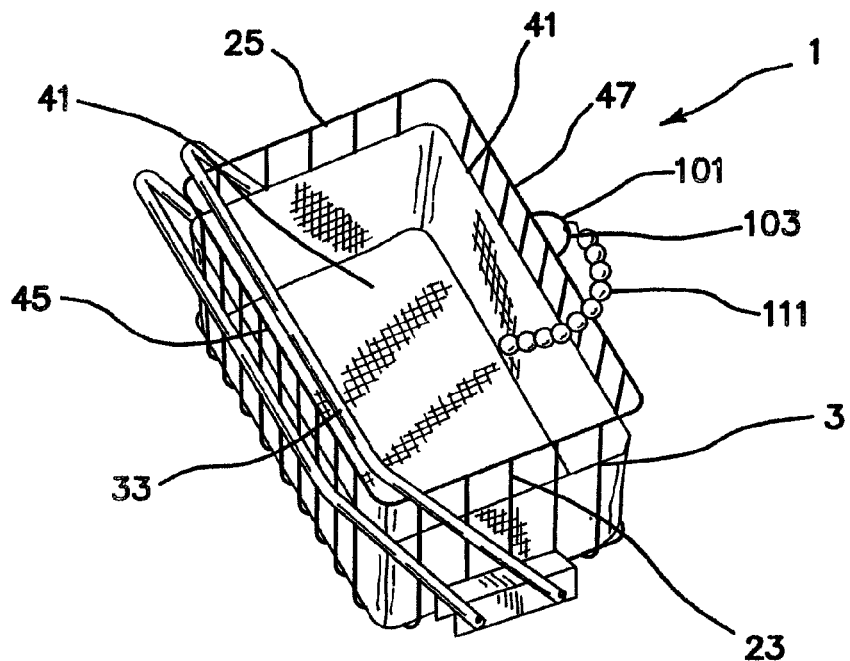
FIG. 4 is a close up view of the canopy assembly in an exemplary embodiment of the present invention.

FIG. 4 illustrates a hook 101 on the rear portion of the basket 3 to attach the pet to the basket 3 for security. For example, if the bicycle were to hit an unexpected bump which caused displacement of the animal, the hook 101 attached to the pet and to the basket 3 may prevent the animal from being dislodged from the device 1. The rear of the canopy closest to the rider may have a metal loop 103 attachment point to allow for attachment of a restraint device such as a leash 111 or harness to tether to the frame and pet by means of a body harness (not shown).

Figure 5:
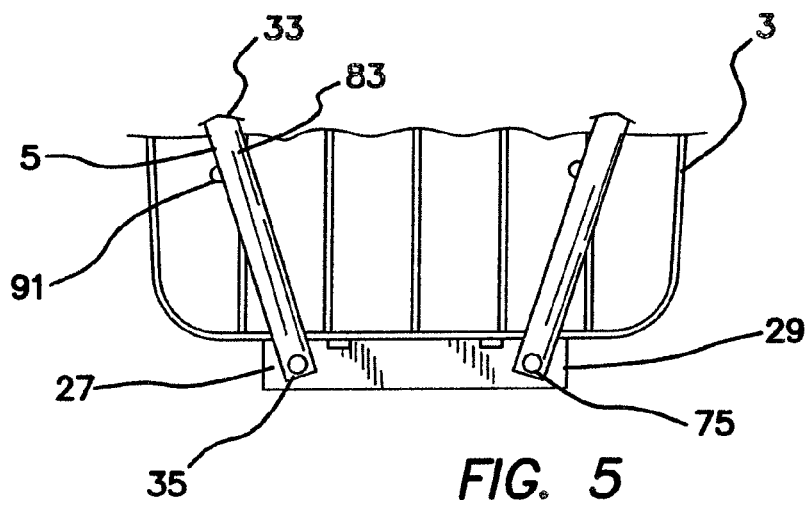
FIG. 5 is a front elevational view of the key ring in an engaged and fixed position in an exemplary embodiment of the present invention.

FIG. 5 illustrates the canopy cover assembly 5 whereby the canopy 5 is attached to the basket 3 by a bracket means. The canopy cover assembly 5 may include a bracket 27, a bracket plate 29, canopy arms 83, a pivot hinge 35, a compression gasket 91 and attachment means 75 such as screws to attach the canopy cover assembly 5 to the basket 3. The bracket plate 29 may have a second compression gasket 98 adhered thereto on one side that will face the basket 3 and compression side of the canopy bracket 98. A plurality of screws (not shown) may be utilized from inside the basket 3, through the bracket plate 29, into the bracket 27 and tighten into the threaded nuts attached to the bracket 27. This may be done on both sides of the basket 3 to secure the basket 3 in place.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

What is claimed is:

1. An animal transport device, the device comprising:
    a basket adapted for fitment of an animal the basket having a padded rail on the outside portion of the basket for safety and security of the transported animal;
    a clasp assembly to attach the basket to a mobile vehicle wherein said clasp assembly is attached to the handlebars of a mobile vehicle;
    a metal loop attachment on a rear arm of the basket to secure the animal to the basket; and
    a canopy assembly having a plurality of canopy arms which are pivotable about the basket whereby the canopy assembly is removably attached to the basket and further wherein the canopy assembly and the basket are attached to the handlebars of a mobile vehicle.

2. The animal transport device of claim 1 wherein the mobile vehicle is a bicycle.

3. The animal transport device of claim 1 wherein said canopy assembly is adapted to extend above the basket and the head of an animal to provide shade for the animal.

4. The animal transport device of claim 1 wherein the basket may further comprise at least a liner and cushion to protect the animal's feet from protruding away from the basket.

5. The animal transport device of claim 1 wherein said basket having at least a first side, a second side, a third side and a fourth side whereby each of said sides extend upwards away from the bottom portion of the basket.

6. The animal transport device claim 5 wherein the top portion of each side has a padded rail which protects the animal's extremities from injury.

7. The animal transport device of claim 1 wherein said basket is constructed of metal.

8. The animal transport device of claim 1 wherein said canopy assembly is constructed of any of the following: nylon, cotton, canvas, rip-stop nylon, foam and plastic.

9. The animal transport device of claim 1 wherein said canopy assembly is foldable and collapsible for storage of the canopy when not in use.

10. The animal transport device of claim 1 wherein the canopy assembly is comprised of at least an arm attached to a pivot hinge and a bracket whereby the bracket is attached to the basket by an attachment means and a bracket plate.

11. A method of utilizing an animal transport device, the method comprising the steps of:
    providing a basket adapted for fitment of an animal said basket having a hook extending away from the basket to secure the animal;
    providing a clasp assembly to attach the basket to a mobile transport vehicle; and
    installing a canopy assembly having at least a canopy arm which is pivotable about the basket whereby the canopy assembly is pivotally hinged and removably attached to the basket wherein the canopy assembly is comprised of at least a canopy arm attached to a pivot hinge and a bracket whereby the bracket is attached to the basket by an attachment means and a bracket plate and further wherein the canopy assembly is adapted to extend above the basket and the head of an animal to provide shade for the animal.

12. The method of utilizing an animal transport device of claim 11, the method further comprising the step of:
    providing a canopy assembly with at least an arm attached to a pivot hinge for pivoting of the canopy assembly relative to the basket.

13. The method of utilizing an animal transport device of claim 11, the method further comprising the step of:
    attaching the canopy assembly and the basket to the handlebars of a mobile transport vehicle.

14. The method of utilizing an animal transport device of claim 11, the method further comprising the step of:
    providing a mobile transport vehicle whereby the vehicle is a bicycle.

15. The method of utilizing an animal transport device of claim 11, the method further comprising the step of:
    allowing said canopy assembly to pivot about the basket on the hinge such that the canopy may be positioned in either an extended overhead position or in a retracted open position.

16. The method of utilizing an animal transport device of claim 11, the method further comprising the step of:
    providing at least a pouch in the basket for storage of an article.

17. The method of utilizing an animal transport device of claim 11, the method further comprising the step of:
    providing a padded rail on the outside portion of the basket for safety and security of the transported animal.

18. The method of utilizing an animal transport device of claim 11, the method further comprising the step of:
    providing a liner and cushion for the bottom portion of the basket to secure and protect the animal from limbs protruding from the basket.

19. The method of utilizing an animal transport device of claim 11, the method further comprising the step of:
    providing at least a hooking mechanism which is attached to the basket and the animal for securing the animal to the basket in the event of potential disturbance and dislodgement.

* * * * *